(12) United States Patent
Liu

(10) Patent No.: US 12,532,374 B2
(45) Date of Patent: Jan. 20, 2026

(54) RECOVERY FAILURE PROCESSING METHOD AND APPARATUS FOR INTEGRATED ACCESS BACKHAUL RADIO LINK, AND COMMUNICATIONS DEVICE

(71) Applicant: VIVO MOBILE COMMUNICATION CO., LTD., Dongguan (CN)

(72) Inventor: Jinhua Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 821 days.

(21) Appl. No.: 17/880,581

(22) Filed: Aug. 3, 2022

(65) Prior Publication Data

US 2022/0377827 A1 Nov. 24, 2022

Related U.S. Application Data

(63) Continuation of application No. PCT/CN2021/075776, filed on Feb. 7, 2021.

(30) Foreign Application Priority Data

Feb. 7, 2020 (CN) .......................... 202010083012.0

(51) Int. Cl.
*H04W 76/19* (2018.01)
*H04W 68/00* (2009.01)
*H04W 88/08* (2009.01)

(52) U.S. Cl.
CPC ......... *H04W 76/19* (2018.02); *H04W 68/005* (2013.01); *H04W 88/08* (2013.01)

(58) Field of Classification Search
CPC .... H04W 76/19; H04W 68/005; H04W 88/08
USPC .......................................................... 370/329
See application file for complete search history.

(56) References Cited

U.S. PATENT DOCUMENTS

| | | | |
|---|---|---|---|
| 2017/0171903 A1 | 6/2017 | Kubota et al. | |
| 2019/0124181 A1 | 4/2019 | Park et al. | |
| 2019/0327660 A1 | 10/2019 | Hong et al. | |
| 2020/0092784 A1* | 3/2020 | Hampel | H04W 40/22 |

(Continued)

FOREIGN PATENT DOCUMENTS

| | | | |
|---|---|---|---|
| CN | 107820266 A | 3/2018 | |
| CN | 110536350 A | 12/2019 | |

(Continued)

OTHER PUBLICATIONS

NEC, IAB backhaul RLF handling (R2-1914975), 2019. (Year: 2019).*

(Continued)

*Primary Examiner* — Christopher R Crompton
(74) *Attorney, Agent, or Firm* — IPX PLLC

(57) ABSTRACT

A recovery failure processing method for an integrated access backhaul radio link and a communications device are provided. The recovery failure processing method for an integrated access backhaul radio link is performed by an integrated access backhaul (IAB) node in an integrated access backhaul link and includes: sending, in a case that the radio link fails to recover, a radio link recovery failure message to a child IAB node, where the radio link recovery failure message includes a message type indicator, and the message type indicator indicates a message type of the radio link recovery failure message.

16 Claims, 12 Drawing Sheets

Receive a radio link recovery failure message of an IAB node, where the radio link recovery failure message includes a message type indicator, and the message type indicator indicates a message type of the radio link recovery failure message — 201

Reestablish a radio link — 202

(56) References Cited

U.S. PATENT DOCUMENTS

2022/0038164 A1* 2/2022 Wei ..................... H04W 88/14

FOREIGN PATENT DOCUMENTS

CN 110536351 A 12/2019
CN 110636628 A 12/2019

OTHER PUBLICATIONS

Extended European Search Report issued in related European Application No. 21751197.1, mailed May 15, 2023, 9 pages.
Anonymous: "3rd Generation Partnership Project; Technical Specification Group Radio Access Network; NR; Study on Integrated Access and Backhaul; (Release 16)", 3GPP TR 38.874 v 16.0.0, XP051591643; Jan. 2019, 111 pages.
International Search Report issued in corresponding International Application No. PCT/CN2021/075776, mailed May 7, 2021, 5 pages.
ZTE et al., "Discussion on IAB BH RLF handling", 3GPP TSG-RAN WG2 Meeting #109bis-e R2-2002855, Apr. 2020.
NEC, "IAB backhaul RLF handling", 3GPP TSG-RAN WG2 #108 R2-1914975, Nov. 2019.
ZTE et al., "Discussion on BAP control PDU", 3GPP TSG RAN WG2 Meeting #108 R2-1915115, Nov. 2019.
First Office Action issued in related Chinese application No. 202010083012.0, mailed Jan. 20, 2022, 9 pages.
Huawei et al., "Routing and RLF handling for the IAB node connecting to multiple donor DUs" 3GPP TSG-RAN WG3 meeting #105bis, R3-195466, Oct. 2019.

* cited by examiner

RECOVERY FAILURE PROCESSING METHOD AND APPARATUS FOR INTEGRATED ACCESS BACKHAUL RADIO LINK, AND COMMUNICATIONS DEVICE

CROSS-REFERENCE TO RELATED APPLICATIONS

This application is a continuation of International Application No. PCT/CN2021/075776, filed Feb. 7, 2021, which claims priority to Chinese Patent Application No. 202010083012.0, filed Feb. 7, 2020. The entire contents of each of the above-referenced applications are expressly incorporated herein by reference.

TECHNICAL FIELD

The present disclosure relates to the field of communications technologies, and in particular, to a recovery failure processing method and apparatus for an integrated access backhaul radio link, and a communications device.

BACKGROUND

The relay technology is to add one or more relay nodes between a base station and User Equipment (UE). The relay node is responsible for forwarding a radio signal one or more times, that is, the radio signal needs to have a multi-hop before reaching the base station or the UE. A relatively simple two-hop relay is taken as an example, that is, one link of base station-UE is divided into two links: base station-relay station and relay station-UE. Thus, there is an opportunity to replace one link with poor quality with two links with better quality for a greater link capacity and better coverage.

In the fifth-generation communication technology (5G), the wireless relay used as a backhaul is studied. In order to achieve multiple transmissions more effectively, the distance between wireless backhaul nodes may be shorter, and the wireless backhaul nodes may be deployed more densely.

In an integrated access backhaul (IAB) system, after determining that a backhaul link to a parent IAB node fails, an IAB node may try to recover the backhaul link, and if the backhaul link cannot be recovered (that is, the recovery fails), the IAB node may send radio link recovery failure information to a downstream IAB node, so that the downstream IAB node can find a new parent IAB node. The IAB node needs to notify the downstream node of the radio link recovery failure information, and a structure of the radio link recovery failure information and the behavior of the IAB node after receiving the radio link recovery failure information may affect the performance of backhaul link reestablishment (such as a service interruption time).

SUMMARY

Embodiments of the present disclosure provide a recovery failure processing method and apparatus for an integrated access backhaul radio link, and a communications device, which can ensure the performance of a reestablished backhaul link.

According to a first aspect, an embodiment of the present disclosure provides a recovery failure processing method for an integrated access backhaul radio link, performed by an integrated access backhaul (IAB) node in an integrated access backhaul link and including:

sending, in a case that the radio link fails to recover, a radio link recovery failure message to a child IAB node, where the radio link recovery failure message includes a message type indicator, and the message type indicator indicates a message type of the radio link recovery failure message.

According to a second aspect, an embodiment of the present disclosure further provides a recovery failure processing method for an integrated access backhaul radio link, performed by a child integrated access backhaul (IAB) node in an integrated access backhaul link and including:

receiving a radio link recovery failure message of an IAB node, where the radio link recovery failure message includes a message type indicator, and the message type indicator indicates a message type of the radio link recovery failure message; and reestablishing a radio link.

According to a third aspect, an embodiment of the present disclosure further provides a recovery failure processing apparatus for an integrated access backhaul radio link, performed by an integrated access backhaul (IAB) node in an integrated access backhaul link and including:

a sending module, configured to send, in a case that the radio link fails to recover, a radio link recovery failure message to a child IAB node, where the radio link recovery failure message includes a message type indicator, and the message type indicator indicates a message type of the radio link recovery failure message.

According to a fourth aspect, an embodiment of the present disclosure further provides a recovery failure processing apparatus for an integrated access backhaul radio link, performed by a child integrated access backhaul (IAB) node in an integrated access backhaul link and including:

a receiving module, configured to receive a radio link recovery failure message of an IAB node, where the radio link recovery failure message includes a message type indicator, and the message type indicator indicates a message type of the radio link recovery failure message; and a processing module, configured to reestablish a radio link.

According to a fifth aspect, an embodiment of the present disclosure further provides a communications device, where the communications device includes a processor, a memory, and a computer program stored in the memory and executable on the processor, and when the processor executes the computer program, steps of the recovery failure processing method for an integrated access backhaul radio link described above are implemented.

According to a sixth aspect, an embodiment of the present disclosure further provides a computer-readable storage medium, where the computer-readable storage medium stores a computer program, and when the computer program is executed by the processor, steps of the recovery failure processing method for an integrated access backhaul radio link described above are implemented.

In the above solutions, in a case that the radio link fails to recover, the IAB node sends a radio link recovery failure message to a child IAB node, where the radio link recovery failure message includes a message type indicator, and the message type indicator indicates a message type of the radio link recovery failure message. After receiving the radio link recovery failure message, the child IAB node can identify that the message type belongs to the radio link recovery failure message based on the message type indicator, and then reestablishes the radio link. In the technical solutions of the present disclosure, the performance of the reestablished backhaul link can be guaranteed.

BRIEF DESCRIPTION OF DRAWINGS

To describe the technical solutions of the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
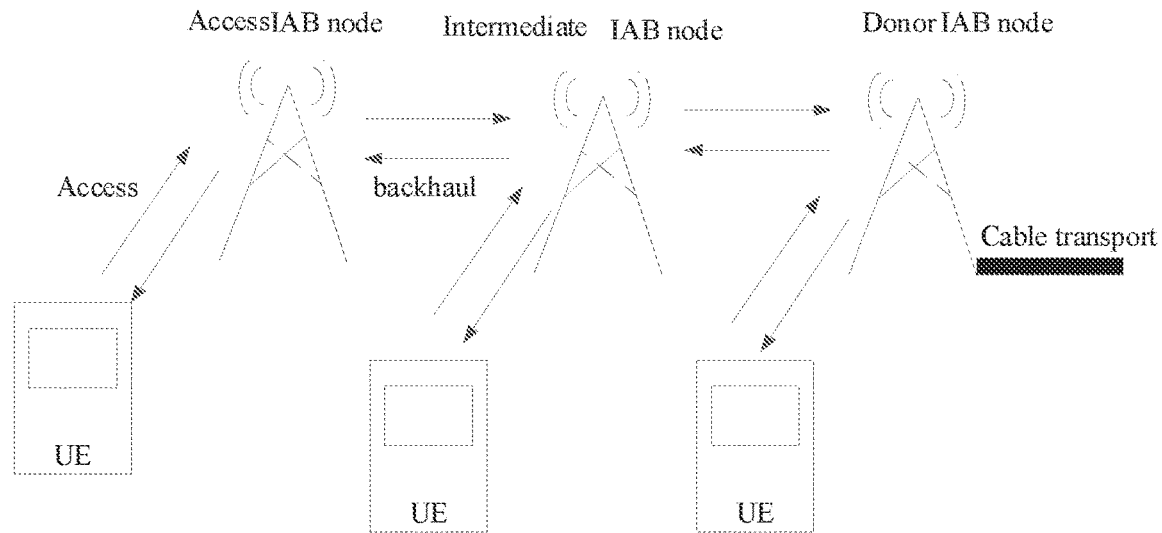
FIG. 1 is a schematic diagram of an IAB system.

Exemplary embodiments of the present disclosure will be described below in further detail with reference to the accompanying drawings. Although the exemplary embodiments of the present disclosure are shown in the accompanying drawings, it should be understood that the present disclosure may be implemented in various forms without being limited to the embodiments described herein. On the contrary, these embodiments are provided to enable a more thorough understanding of the present disclosure and to fully convey the scope of the present disclosure to those skilled in the art.

Terms "first,", "second", or the like in the specification and claims of this application are used to distinguish similar objects, instead of describing a specific sequence or order. It should be understood that the data termed in such a way is interchangeable in proper circumstances so that the embodiments of this application described herein can be implemented in an order other than the order illustrated or described herein. In addition, terms "include", "have", and any variants thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. "And/or" used in the specification and claims means at least one of the connected objects.

The technology described in this specification is not limited to a Long Term Evolution LTE) system or an LTE-advanced LTE-A) system, and may also be used in various wireless communications systems, for example, Code Division Multiple Access (CDMA), Time Division Multiple Access TDMA), Frequency Division Multiple Access FDMA), Orthogonal Frequency Division Multiple Access (OFDMA), Single-carrier Frequency Division Multiple Access SC-FDMA), and other systems. The terms "system" and "network" are often exchanged in use. A CDMA system may implement a radio technology such as CDMA 2000 or Universal Terrestrial Radio Access (U IRA). UTRA includes wideband CDMA (WCDMA) and another CDMA variation. A TDMA system may implement a radio technology such as Global System for Mobile Communication GSM). An OFDMA system may implement a radio technology such as Ultra Mobile Broadband (UMB), Evolution-UTRA E-UTRA), IEEE 802.11 (Wi-Fi), IEEE 802.16 (WiMAX), IEEE 802.20, or Flash-OFDM. UTRA and E-UTRA are parts of a Universal Mobile Telecommunications System (UMTS). LTE and advanced LTE (for example, LTE-A) are new UMTS versions that use E-UTRA. UTRA, E-UTRA, UMTS, LTE, LTE-A, and GSM are described in documents from an organization named "3rd generation partnership project" 3GPP). The CDMA2000 and UMB are described in a document of an organization named "3rd Generation Partnership Project 2" (3GPP2). The technologies described in the present disclosure may also be used in the foregoing systems and radio technologies, and may also be used in another system and radio technology. However, an NR system is described in the following description for illustrative purposes, and an NR terminology is used in most of the following descriptions, although these technologies can also be applied to applications other than the NR system application.

The following description provides examples and does not limit the scope, applicability, or configuration set forth in the claims. Changes may be made to the function and arrangement of discussed elements without deviating from the spirit and scope of the present disclosure. In various examples, various procedures or components may be omitted, replaced, or added appropriately. For example, the described method may be performed according to a sequence different from the described sequence, and various steps may be added, omitted, or combined. In addition, features described with reference to some examples may be combined in other examples.

FIG. 1 is a schematic diagram of an integrated access backhaul (IAB) system. As shown in FIG. 1, an IAB node includes a Distributed Unit (DU) functional part and a Mobile Termination (MT) functional part. Based on the MT, an access point (namely, an Access IAB node) may find an upstream access point (parent IAB node) and establish a wireless connection with a DU of the upstream access point, and the wireless connection is called a backhaul link. After an IAB node establishes a complete backhaul link, the IAB node enables a DU function of the backhaul link, and the DU may provide a cell service, that is, the DU may provide an access service for UE. An integrated access backhaul loop includes a donor IAB node, and the donor IAB node has a directly connected wired transmission network. In FIG. 1, cable transport is wired transmission, and Intermediate IAB node is an intermediate IAB node.

Figure 2:
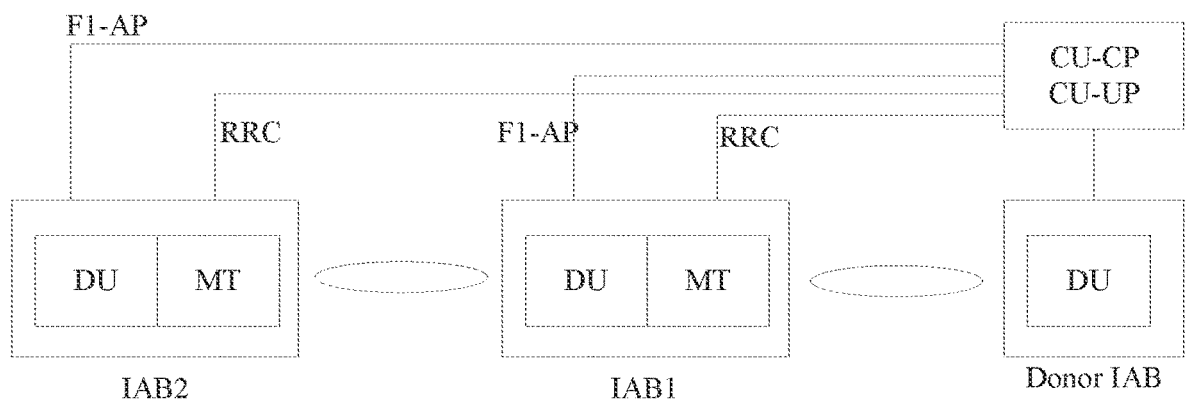
FIG. 2 is a structural diagram of CU-DU in an IAB system.

FIG. 2 is a structural diagram of a Control Unit (CU) in an IAB system. In an integrated access backhaul loop, DUs of all IAB nodes are connected to a CU node, and the CU node configures the DU through an F1-Application Protocol (F1-AP Protocol). The CU configures the MT through a Radio Resource Control (RRC) protocol. The donor IAB node is not provided with the MT functional part.

The IAB system is introduced to solve the problem that the wired transmission network is not deployed in place when the access points are densely deployed. That is, when there is no wired transmission network, the access point may rely on wireless backhaul.

In a protocol stack of the IAB, a new protocol layer is introduced, namely, a Backhaul Adaptation Protocol (BAP) layer. The BAP layer has two basic functions: one is a routing function, that is, to determine a transmission path and forwarding, to send uplink data from the UE to the donor IAB node (namely, the CU) via the access IAB node, or to send downlink data from the donor IAB node (namely, the CU) to the access IAB node, and then the access IAB node sends the downlink data to the UE; the second is a signaling and/or data bearer (UE SRB/DRB) mapping (bearer mapping) function, that is, a Signaling Radio Bearer (SRB) and/or a Data Radio Bearer (DRB) of the UE are mapped to a Radio Link Control (RLC) channel of the backhaul link. Currently, a plurality of UE SRBs/DRBs are supported to be mapped to one backhaul link RLC channel, and one UE SRB/DRB is also supported to be mapped to one backhaul link RLC channel. The BAP entity in an IAB node may be divided into two parts, namely, an MT part and a DU part: the MT part receives the downlink data from the upstream link and sends the received data to an upper protocol layer or forwards the received data to the DU part of the BAP entity, or maps the received uplink data forwarded by the DU part of the BAP entity to the RLC channel of the selected upstream link, and send the data; the DU part of the BAP entity receives the uplink data from the downstream link, and sends the data to the upper protocol layer, or forwards the data to the MT part of the BAP entity, or maps the data received from the MT of the BAP entity to the RLC channel of the selected downstream link, and sends the data.

Figures 3, 4:
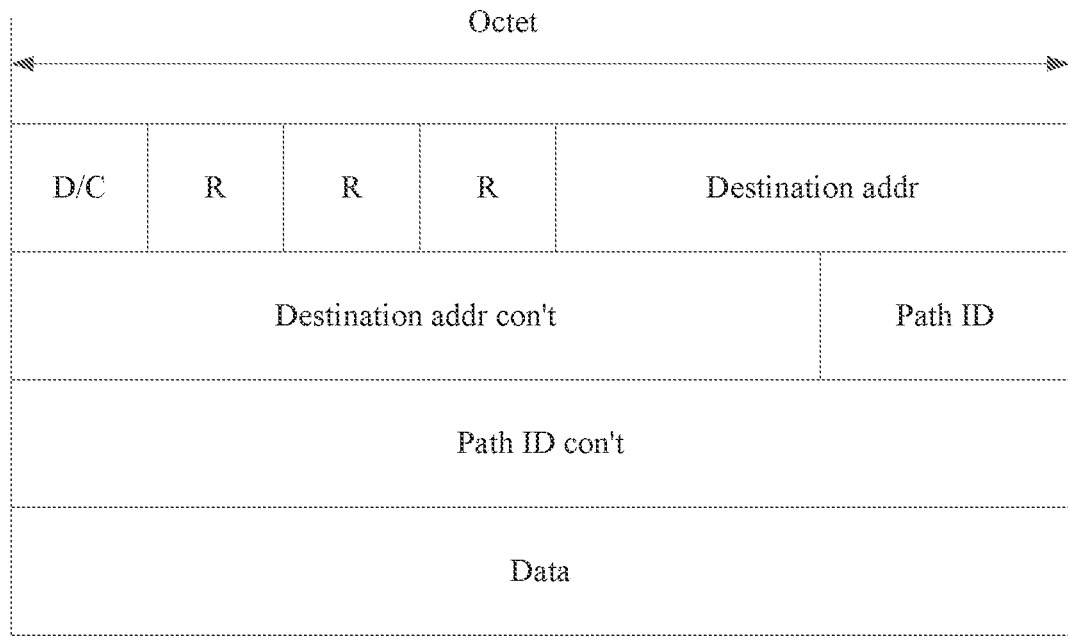
FIG. 3 is a schematic diagram of a format of BAP PDU in the related art.
FIG. 4 is a schematic flowchart of a recovery failure processing method for an integrated access backhaul radio link of an IAB node according to an embodiment of the present disclosure.

A format of a BAP Protocol Data Unit (PDU) is shown in FIG. 3. D/C is used to identify whether the BAP PDU transmits data information or control information, Destination Addr is a destination address of data transmission, a destination address of downlink data transmission is an access IAB node of the UE, and a destination address of uplink data transmission is a donor IAB node (namely, the CU). In addition to transmitting data, the BAP PDU may also be used to transmit the control information.

Similar to the UE, the MT of the IAB node also detects the quality of the backhaul link of the parent IAB node, and if the quality is too poor, a Radio Link Failure (RLF) may be triggered. After triggering the RLF of the parent IAB node, an IAB node may try to restore the radio link, that is, the IAB node may try to find an available parent IAB node (the node may or may not be an original parent IAB node) for radio link reestablishment. If it fails to reestablish the radio link, the IAB node may generate an RLF recovery failure message and send the message to the downstream IAB node, and the downstream IAB node tries to reestablish the radio link again. If the reestablishment fails, an RLF recovery failure message may be generated and sent to an IAB node located further downstream.

In the related art, in a case that the radio link of the parent IAB node fails to recover, an IAB node uses a BAP control PDU to send radio link recovery failure information to the downstream IAB node. However, the format and specific content of the radio link recovery failure information have not yet been determined. After receiving the radio link recovery failure information, an IAB node may trigger radio link reestablishment of the IAB node, and therefore, a design of the radio link recovery failure information and a processing behavior of the IAB node after receiving the radio link recovery failure information may affect a selection of the parent IAB node and a service interruption duration in the radio link reestablishment. In order to avoid selecting an inappropriate parent IAB node and to reduce the service interruption duration, it is necessary to have a proper radio link recovery failure information design and a process for the IAB node to process the received radio link recovery failure information.

An embodiment of the present disclosure provides a recovery failure processing method for an integrated access backhaul radio link, performed by an IAB node in an integrated access backhaul link, as shown in FIG. 4, and including:

Step 101: Send, in a case that the radio link fails to recover, a radio link recovery failure message to a child IAB node, where the radio link recovery failure message includes a message type indicator, and the message type indicator indicates a message type of the radio link recovery failure message.

In this embodiment, in the case that the radio link fails to recover, the IAB node sends a radio link recovery failure message to a child IAB node, where the radio link recovery failure message includes a message type indicator, and the message type indicator indicates a message type of the radio link recovery failure message. After receiving the radio link recovery failure message, the child IAB node can identify that the message type belongs to the radio link recovery failure message based on the message type indicator, and then reestablishes the radio link. In the technical solutions of the present disclosure, the performance of the reestablished backhaul link can be guaranteed.

In the exemplary embodiments of the present disclosure, the radio link recovery failure message further includes at least one of the following:
  identification information of the IAB node that triggers the radio link recovery failure message, where the identification information may be used to identify the IAB node; or
  an ID list of a path blocked due to radio link recovery failure.

In the exemplary embodiments of the present disclosure, the IAB node that triggers the radio link recovery failure message includes at least one of the following:
  an IAB node that initially triggers the radio link recovery failure message; or
  an IAB node that fails to reestablish a radio link after receiving a radio link recovery failure message of an upstream IAB node.

The identification information includes at least one of the following:

a BAP address identifier, where the BAP address identifier may also be referred to as a BAP entity ID, a BAP ID, or the like;

a cell identifier, including but not limited to a Physical Cell Identifier (PCI) or an E-UTRAN Cell Global Identifier (ECGI); or a pre-allocated IAB node identifier.

Figure 5:
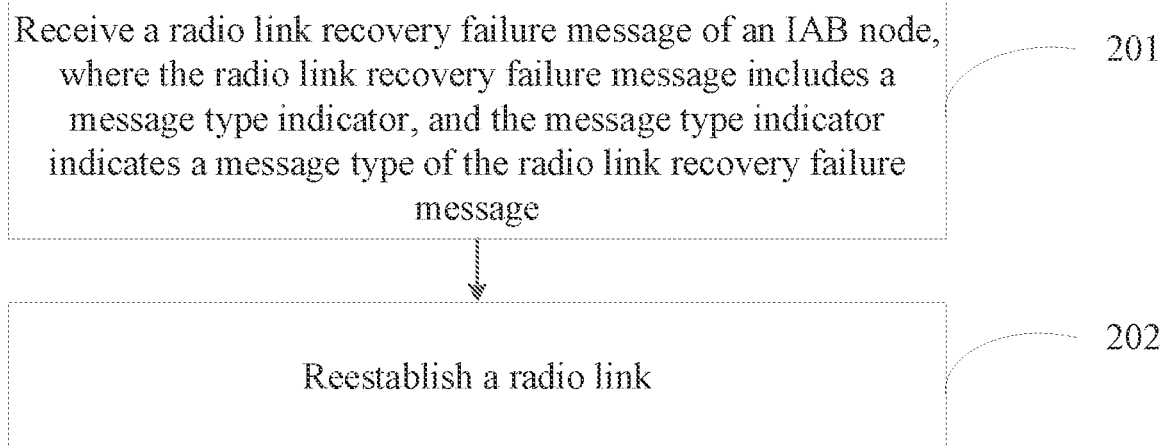
FIG. 5 is a schematic flowchart of a recovery failure processing method for an integrated access backhaul radio link of a child IAB node according to an embodiment of the present disclosure.

An embodiment of the present disclosure further provides a recovery failure processing method for an integrated access backhaul radio link, performed by a child integrated access backhaul (IAB) node in an integrated access backhaul link, as shown in FIG. 5, and including:

Step 201: Receive a radio link recovery failure message of an IAB node, where the radio link recovery failure message includes a message type indicator, and the message type indicator indicates a message type of the radio link recovery failure message.

Step 202: Reestablish a radio link.

In this embodiment, the IAB node sends a radio link recovery failure message to a child IAB node, where the radio link recovery failure message includes a message type indicator, and the message type indicator indicates a message type of the radio link recovery failure message. After receiving the radio link recovery failure message, the child IAB node can identify that the message type belongs to the radio link recovery failure message based on the message type indicator, and then reestablishes the radio link. In the technical solutions of the present disclosure, the performance of the reestablished backhaul link can be guaranteed.

In the exemplary embodiments of the present disclosure, the radio link recovery failure message further includes at least one of the following:
identification information of the IAB node that triggers the radio link recovery failure message, where the identification information may be used to identify the IAB node; or
an ID list of a path blocked due to radio link recovery failure.

In the exemplary embodiments of the present disclosure, the IAB node that triggers the radio link recovery failure message includes at least one of the following:
an IAB node that initially triggers the radio link recovery failure message; or
an IAB node that fails to reestablish a radio link after receiving a radio link recovery failure message of an upstream IAB node.

The identification information includes at least one of the following:
a BAP address identifier, where the BAP address identifier may also be referred to as a BAP entity ID, a BAP ID, or the like;
a cell identifier, including but not limited to a PCI and an ECGI; or
a pre-allocated IAB node identifier.

In this embodiment, after the child IAB node receives the radio link recovery failure message from the IAB node, if the child IAB node does not find a suitable parent IAB node and reestablishes the radio link, the child IAB node needs to determine whether to update the radio link recovery failure message based on a content requirement of the radio link recovery failure message, and then sends the radio link recovery failure message to the downstream IAB node.

In an exemplary embodiment of the present disclosure, in a case that the received radio link recovery failure message only includes the message type indicator, or only includes the message type indicator and the identification information of the IAB node that initially triggers the radio link recovery failure message, the method further includes:
sending, in a case that the radio link fails to reestablish, a first radio link recovery failure message to a downstream IAB node, where the first radio link recovery failure message is the received radio link recovery failure message.

In another exemplary embodiment of the present disclosure, in a case that the received radio link recovery failure message further includes at least one of the following: identification information of the IAB node that fails to reestablish a radio link after receiving a radio link recovery failure message of an upstream IAB node; or the ID list of a path blocked due to radio link recovery failure, the method further includes:
in a case that the radio link fails to reestablish, adding at least one of the following information to the received radio link recovery failure message to form a second radio link recovery failure message, and sending the second radio link recovery failure message to a downstream IAB node:
the identification information of the IAB node; or
the path ID that is blocked due to the radio link failure of the IAB node and that is not included in the received radio link recovery failure message.

In some embodiments, newly added identification information is located at an end of the second radio link recovery failure message.

In the exemplary embodiments of the present disclosure, in a case that the received radio link recovery failure message meets at least one of the following conditions:
including an identification information list of the IAB node that triggers the radio link recovery failure message; or
including the path ID list and being able to determine the IAB node that triggers the radio link recovery failure message based on the path ID list,
in radio link reestablishment, an IAB node other than the IAB node is selected as a parent IAB node, or an IAB node other than the IAB node is selected as a parent IAB node within a preset time window.

In the technical solutions of the present disclosure, the radio link recovery failure message must include the message type indicator, which may include 0, 1, or more of the following information: identification information of the IAB node that initially triggers the radio link recovery failure message, identification information of the IAB node that fails to reestablish a radio link after receiving a radio link recovery failure message of an upstream IAB node; and the ID list of a path blocked due to radio link recovery failure. The radio link recovery failure message may be configured or pre-configured by the network side device, or defined by a protocol.

The technical solutions of the present disclosure will be further described below with reference to the accompanying drawings and specific embodiments:

Embodiment 1

In this embodiment, as shown in FIG. 6*a* to FIG. 6*d*, the radio link recovery failure message carries routing information, where the routing information refers to the destination address (namely, Destination Addr, the destination address for data transmission) and a Path ID.

Figure 6A:
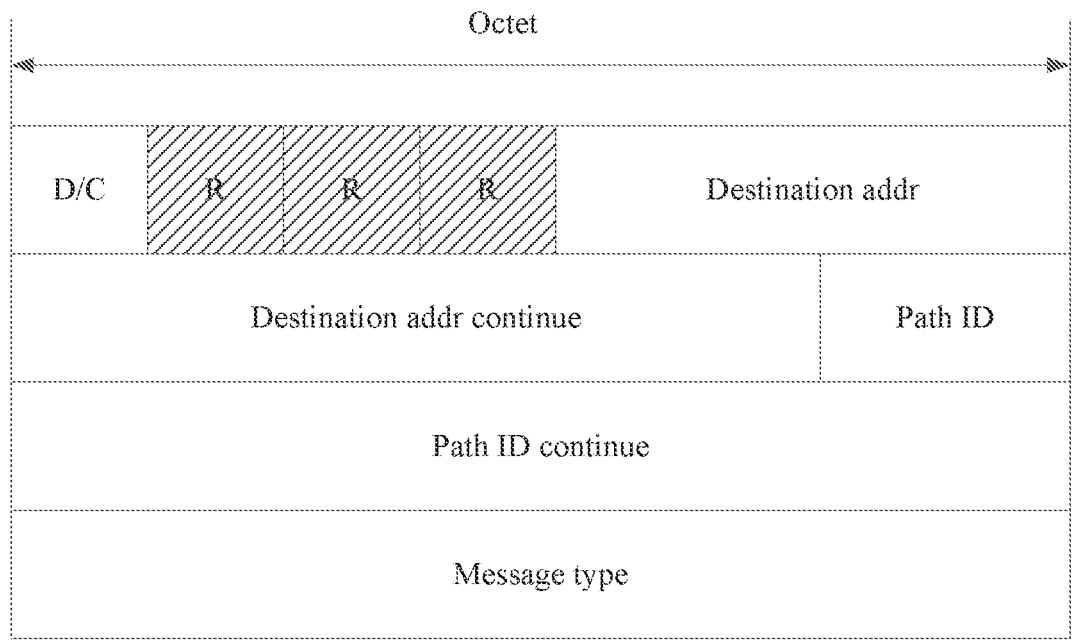
FIG. 6*a* to FIG. 6*d* are schematic diagrams of a format of a radio link recovery failure message carrying routing information according to an embodiment of the present disclosure.

In a specific example, as shown in FIG. 6*a*, the BAP control PDU carrying the radio link recovery failure message includes a D/C field, a Destination Addr field, a Destination Addr continue field, a Path ID field, a Path ID continue field, and a Message type field. The D/C field is used to identify whether the BAP PDU transmits data information or control information, content of the Destination Addr field and the Destination Addr continue field is a destination address of data transmission, content of the Path ID field and the Path ID continue field is an ID list of a path blocked due to radio link recovery failure, R is a reserved bit, and content of the Message type field is a message type indicator.

Figure 6B:
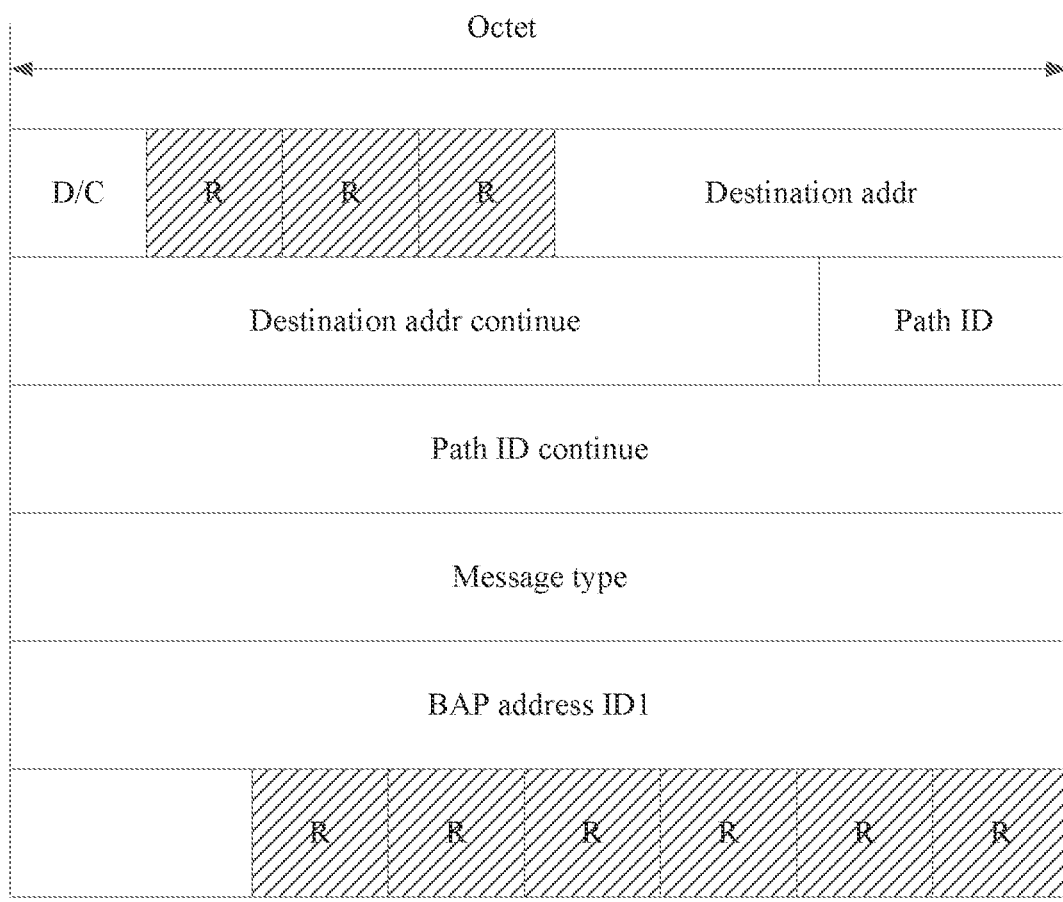

In another specific example, as shown in FIG. 6b, the BAP control PDU carrying the radio link recovery failure message further includes a BAP address ID field, where the content of the BAP address ID field is a BAP address ID of the IAB node that initially triggers the radio link recovery failure message, namely, a BAP address ID1.

Figure 6C:
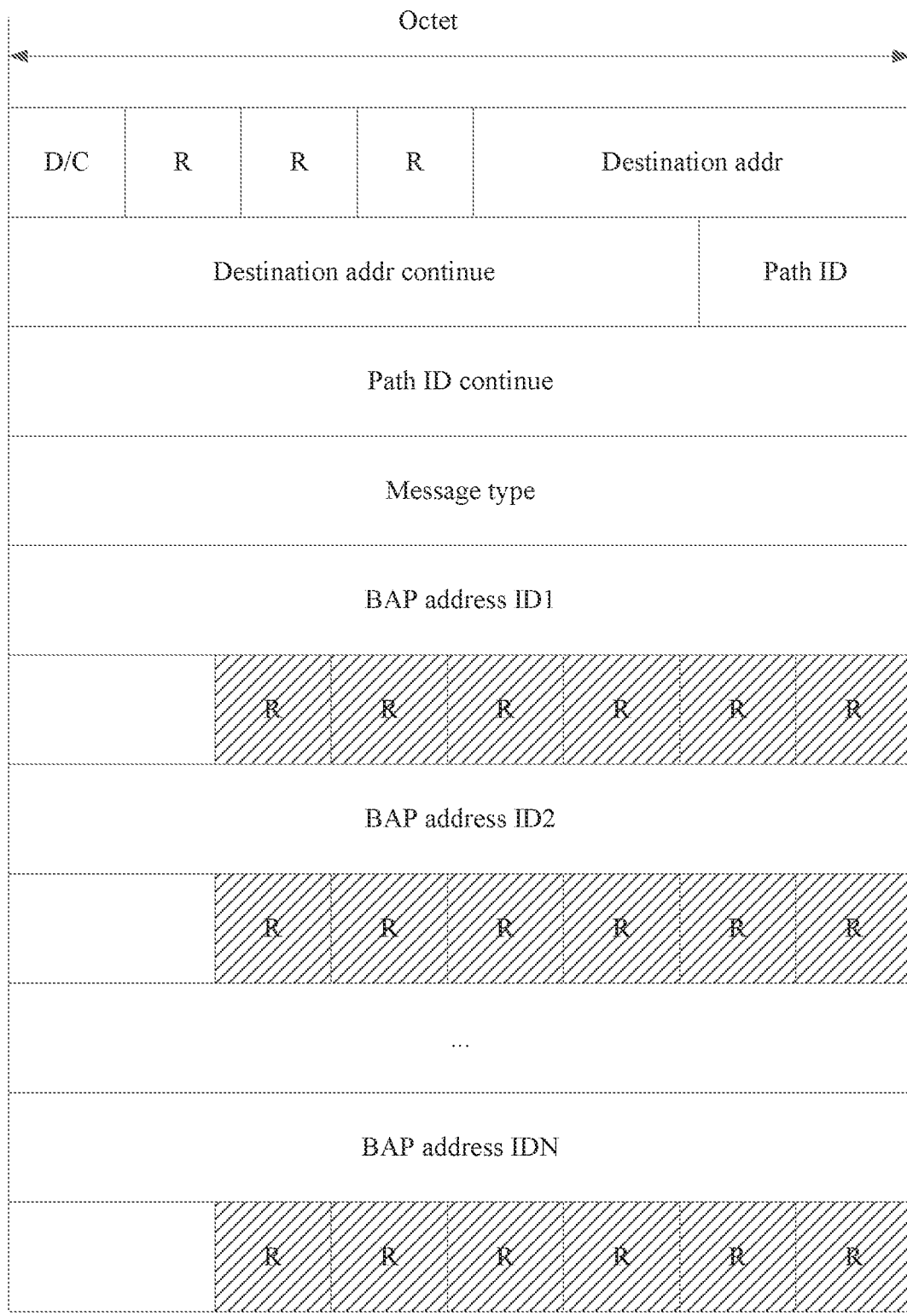

In another specific example, as shown in FIG. 6c, the BAP control PDU carrying the radio link recovery failure message includes a plurality of BAP address ID fields, where the content of the BAP address ID fields includes the BAP address ID of the IAB node that initially triggers the radio link recovery failure message, namely, the BAP address ID1, and a BAP address ID of the IAB node that fails to reestablish the radio link after receiving the radio link recovery failure message of the upstream IAB node, namely, a BAP address ID2 to a BAP address IDN.

Figure 6D:
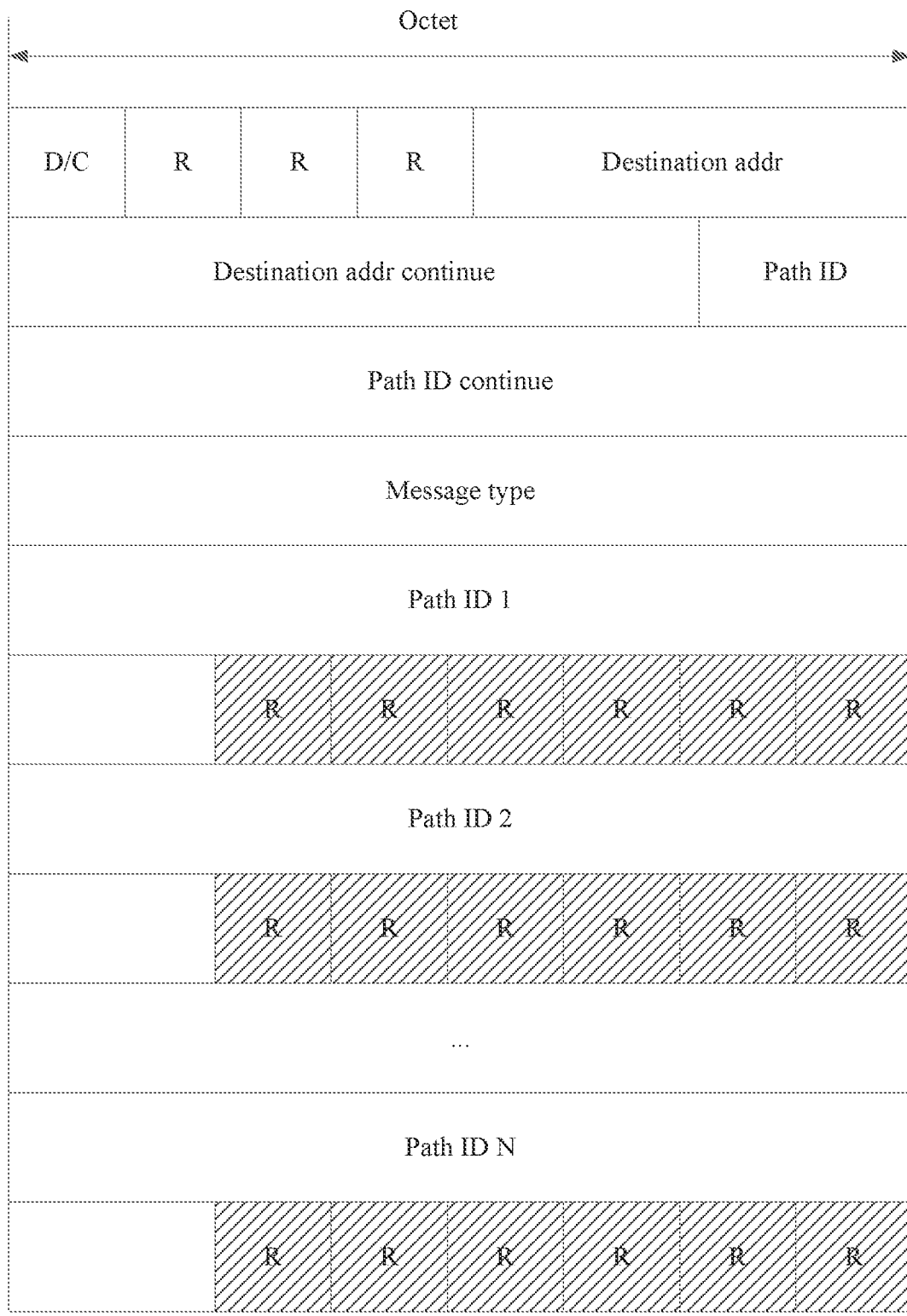

In another specific example, as shown in FIG. 6d, the BAP control PDU carrying the radio link recovery failure message includes a plurality of Path ID fields, where the content of the Path ID field is a list of one or more path IDs blocked due to radio link recovery failure of the IAB node, namely, a Path ID1 to a Path IDN.

Embodiment 2

In this embodiment, as shown in FIG. 7a to FIG. 7d, the radio link recovery failure message does not carry routing information, where the routing information refers to the destination address (namely, Destination Addr, the destination address for data transmission) and a Path ID.

Figure 7A:
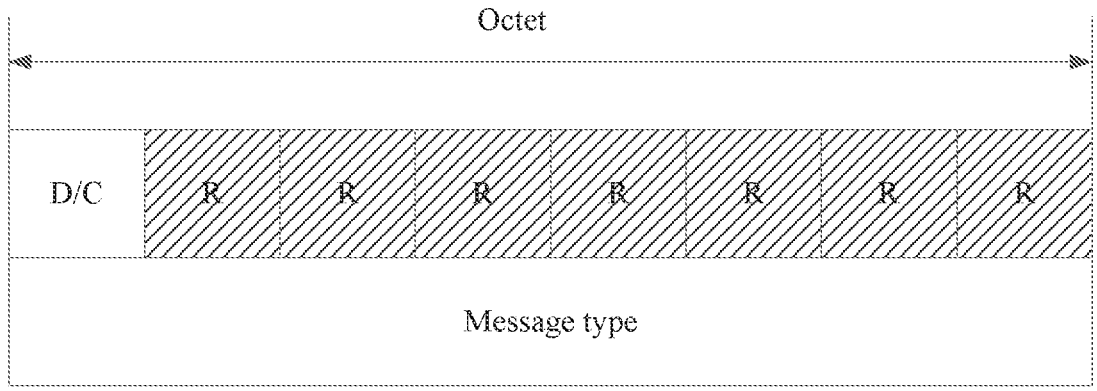
FIG. 7*a* to FIG. 7*d* are schematic diagrams of a format of a radio link recovery failure message not carrying routing information according to an embodiment of the present disclosure.

In a specific example, as shown in FIG. 7a, the BAP control PDU carrying the radio link recovery failure message includes a Message type field, and content of the Message type field is a message type indicator.

Figure 7B:
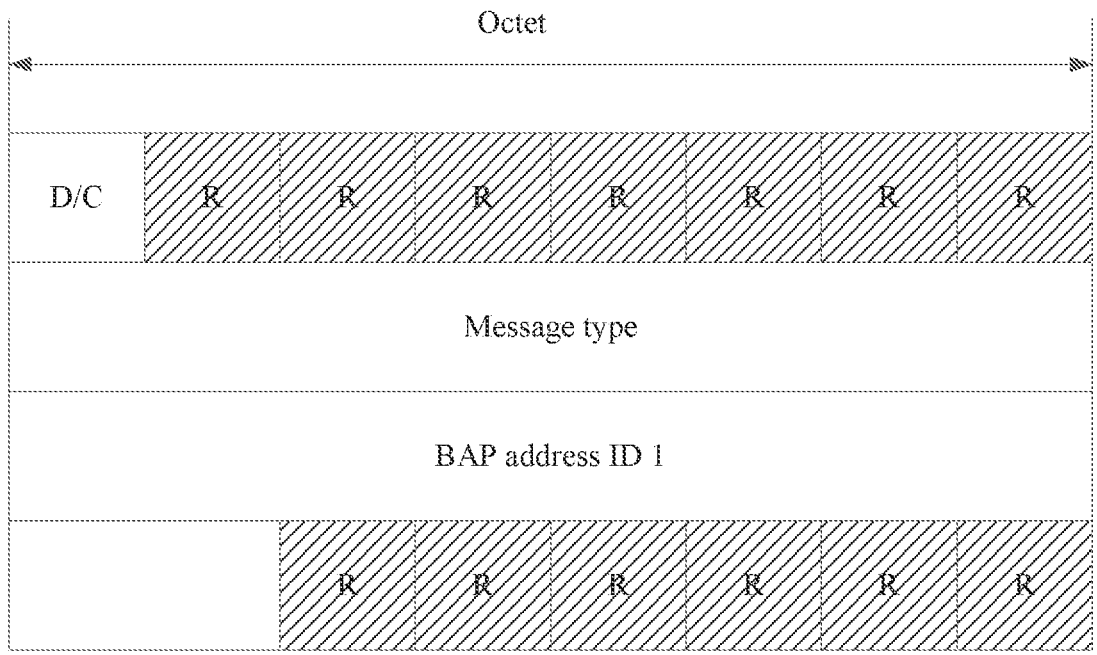

In another specific example, as shown in FIG. 7b, the BAP control PDU carrying the radio link recovery failure message further includes a BAP address ID field, where the content of the BAP address ID field is a BAP address ID of the IAB node that initially triggers the radio link recovery failure message, namely, a BAP address ID1.

Figure 7C:
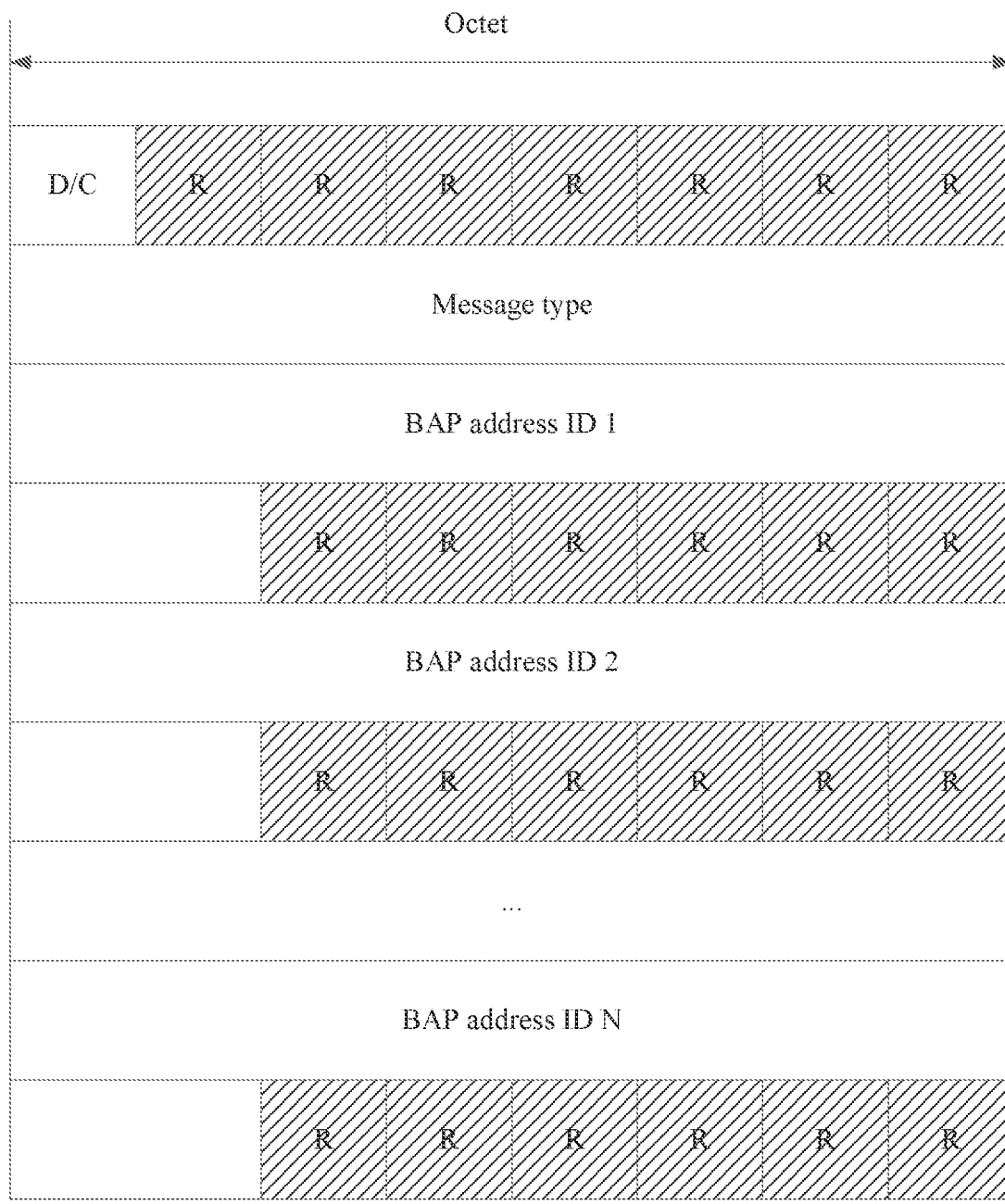

In another specific example, as shown in FIG. 7c, the BAP control PDU carrying the radio link recovery failure message includes a plurality of BAP address ID fields, where the content of the BAP address ID fields includes the BAP address ID of the IAB node that initially triggers the radio link recovery failure message, namely, the BAP address ID1, and a BAP address ID of the IAB node that fails to reestablish the radio link after receiving the radio link recovery failure message of the upstream IAB node, namely, a BAP address ID2 to a BAP address IDN.

Figure 7D:
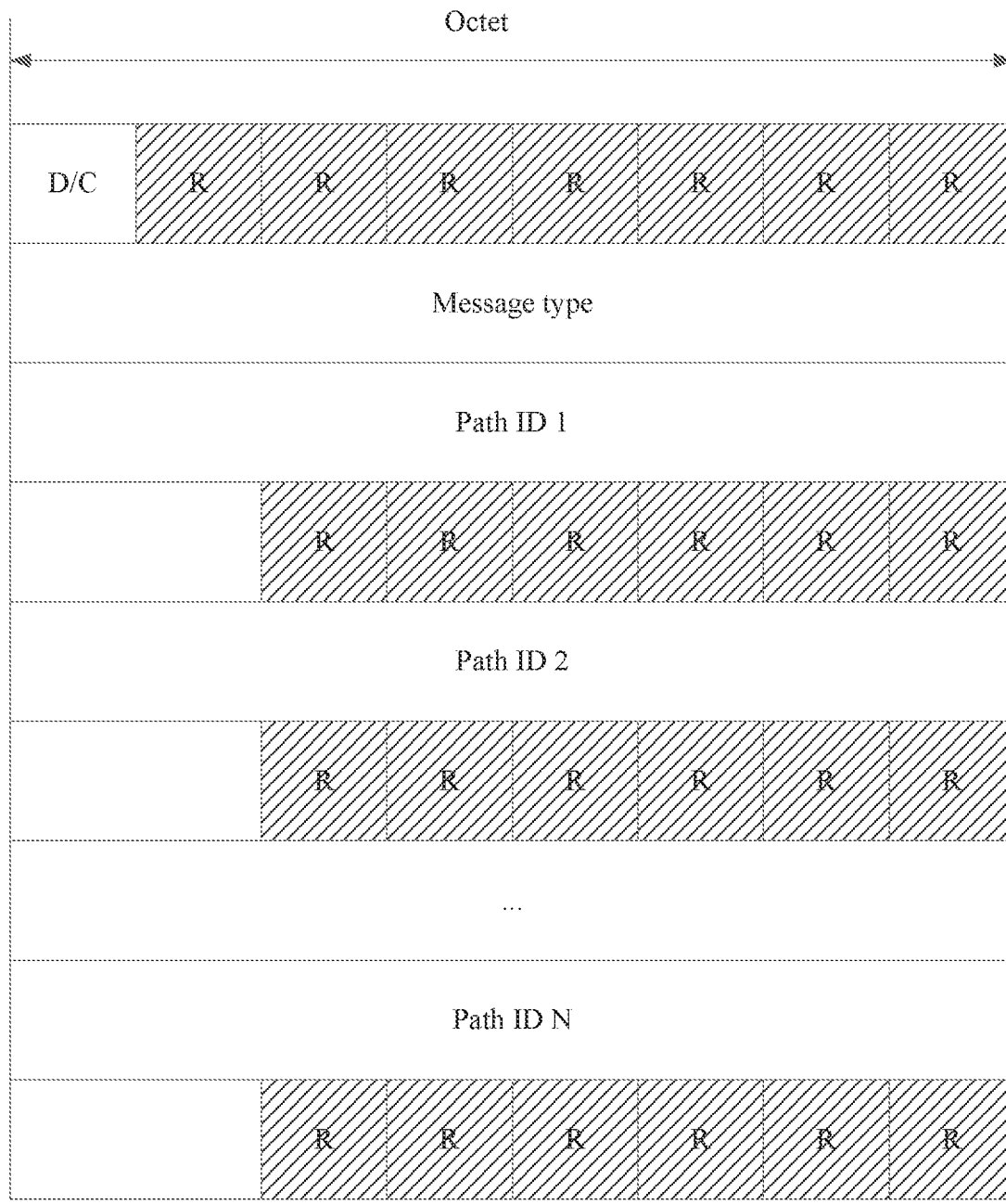

In another specific example, as shown in FIG. 7d, the BAP control PDU carrying the radio link recovery failure message includes a plurality of Path ID fields, where the content of the Path ID field is a list of one or more path IDs blocked due to radio link recovery failure of the IAB node, namely, a Path ID1 to a Path IDN.

In the Embodiment 1 and the Embodiment 2, that the radio link recovery failure message carries the BAP address ID as identification information of the IAB node is taken as an example for description. The radio link recovery failure message may also carry PCI or ECGI as the identification information of the IAB node.

In addition to formats shown in FIGS. 6a-6d and FIGS. 7a-7d, the radio link recovery failure message may also have other formats. For example, the radio link recovery failure message only contains a message type indicator and identification information of the IAB node that sends the radio link recovery failure message, such as a BAP address ID, a cell ID (PCI or ECGI), and a pre-allocated IAB node ID. It should be noted that the IAB node sending the radio link recovery failure message is not necessarily the IAB node that originally triggers the radio link recovery failure message.

Embodiment 3

In this embodiment, the BAP control PDU carrying the radio link recovery failure message only includes the message type indicator and the identification information of the IAB node that sends the radio link recovery failure message, where the identification information may be a BAP address ID, a cell identifier, a pre-allocated IAB node identifier, and the like.

Figure 8:
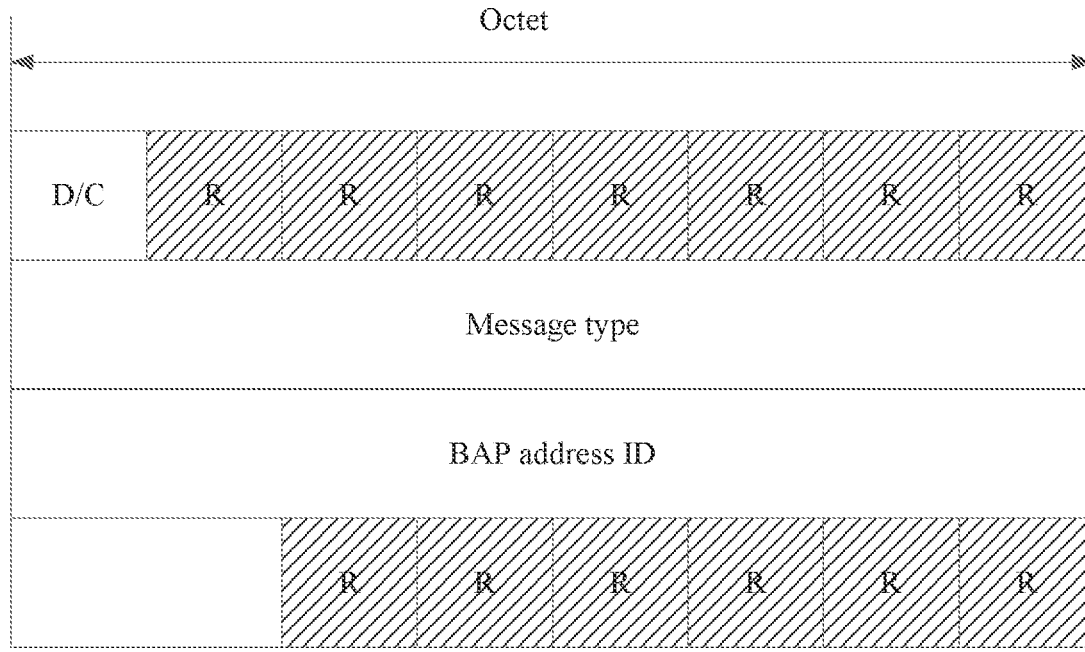
FIG. 8 and FIG. 9 are schematic diagrams of a format of a radio link recovery failure message that only includes a message type indicator and identification information of an IAB node that triggers a radio link recovery failure message.

In a specific example, as shown in FIG. 8, the BAP control PDU carrying the radio link recovery failure message only includes a Message type field and a BAP address ID field.

Figure 9:
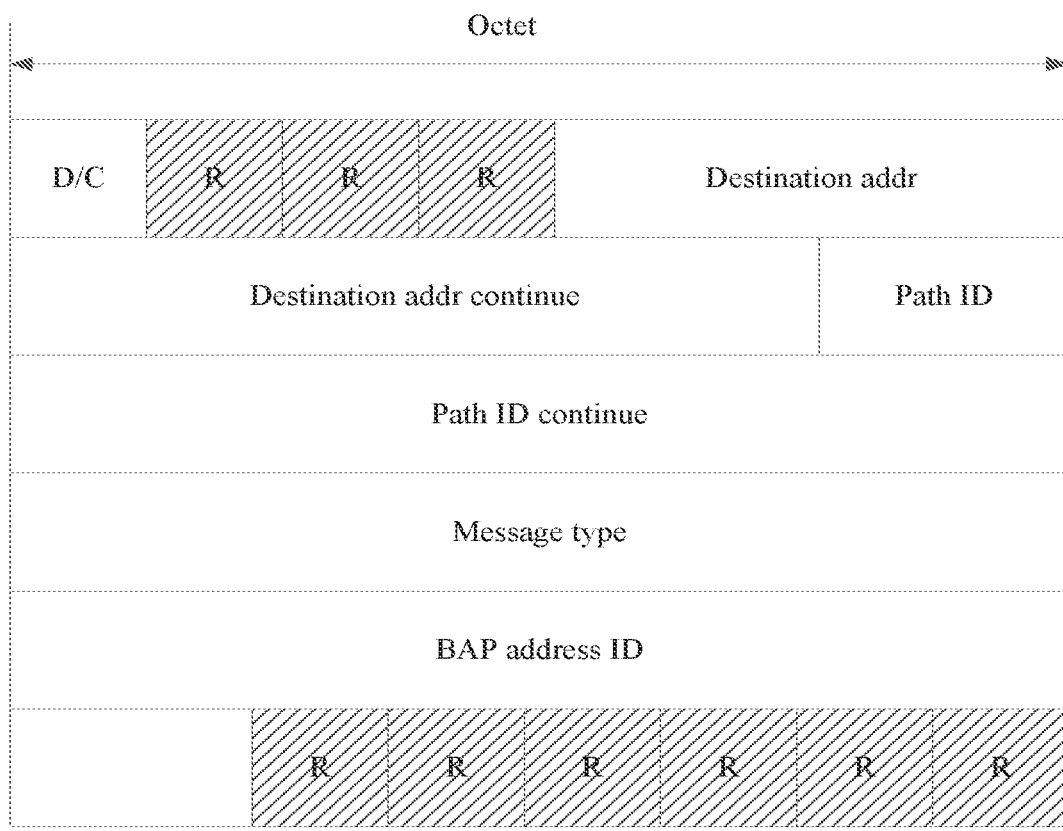

In another specific example, as shown in FIG. 9, the BAP control PDU carrying the radio link recovery failure message further includes a D/C field, a Destination Addr field, a Destination Addr continue field, a Path ID field, and a Path ID continue field.

After receiving the radio link recovery failure message, if an IAB node fails to recover the radio link, the IAB node needs to send the radio link recovery failure message to the downstream IAB node. In this case, if a message format of the radio link recovery failure message configured and/or defined to use only carries the message type indicator of the radio link recovery failure message, or only carries the message type indicator of the radio link recovery failure message and the identification information of the IAB node that initially triggers the radio link recovery failure message, the IAB node directly forwards the received radio link recovery failure message in a case that the radio link fails to recover.

In addition to the message type indicator of the radio link recovery failure message, if the message format of the radio link recovery failure message configured and/or defined to use further carries the identification information of the IAB node that triggers the message type indicator or a list of blocked PATH IDs, in a case that the radio link fails to recover, the IAB node needs to add the identification information thereof or the PATH ID that is blocked due to the radio link failure of the IAB node and that is not included in the received radio link recovery failure message to the received radio link recovery failure message, so as to form a new radio link recovery failure message, and sends the new radio link recovery failure message to the downstream IAB node.

In some embodiments, when an IAB node generates a radio link recovery failure message based on the formats shown in FIG. 6c and FIG. 7c, identification information of the IAB node should be placed at the end of the radio link recovery failure message.

In some embodiments, when an IAB node receives a radio link recovery failure message and the radio link recovery failure message contains a list of identification information of the IAB node that triggers the radio link recovery failure message, or the radio link recovery failure message contains the blocked Path ID list, and the IAB node may determine the IAB node that triggers the radio link recovery failure message based on the Path ID list, the IAB node should exclude cells belonging to these IAB nodes when trying to recover the radio link. There may be a time limit, for example, the IAB node indicated by the radio link recovery failure message cannot be selected as the parent IAB node within 100 seconds.

Figure 10:
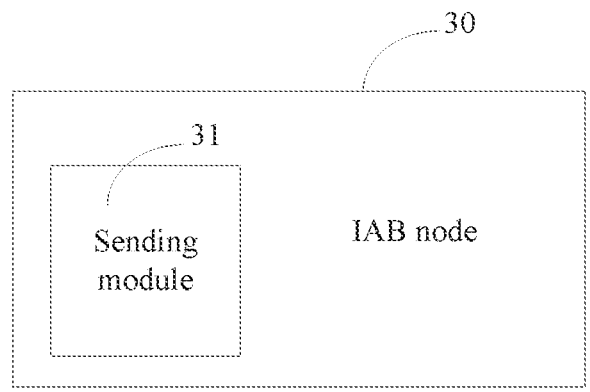
FIG. 10 is a schematic structural diagram of a module of an IAB node according to an embodiment of the present disclosure.

As shown in FIG. 10, the IAB node 30 in this embodiment of the present disclosure includes a recovery failure processing apparatus for an integrated access backhaul radio link that can implement the recovery failure processing method for an integrated access backhaul radio link performed by the IAB node in the foregoing embodiment, and achieve the same effect. In some embodiments, the IAB node 30 includes the following functional modules:

a sending module 31, configured to send, in a case that the radio link fails to recover, a radio link recovery failure message to a child IAB node, where the radio link recovery failure message includes a message type indicator, and the message type indicator indicates a message type of the radio link recovery failure message.

In this embodiment, in the case that the radio link fails to recover, the IAB node sends a radio link recovery failure message to a child IAB node, where the radio link recovery failure message includes a message type indicator, and the message type indicator indicates a message type of the radio link recovery failure message. After receiving the radio link recovery failure message, the child IAB node can identify that the message type belongs to the radio link recovery failure message based on the message type indicator, and then reestablishes the radio link. In the technical solutions of the present disclosure, the performance of the reestablished backhaul link can be guaranteed.

In the exemplary embodiments of the present disclosure, the radio link recovery failure message further includes at least one of the following:
  identification information of the IAB node that triggers the radio link recovery failure message, where the identification information may be used to identify the IAB node; or
  an ID list of a path blocked due to radio link recovery failure.

In the exemplary embodiments of the present disclosure, the IAB node that triggers the radio link recovery failure message includes at least one of the following:
  an IAB node that initially triggers the radio link recovery failure message; or
  an IAB node that fails to reestablish a radio link after receiving a radio link recovery failure message of an upstream IAB node.

The identification information includes at least one of the following:
  a BAP address identifier, where the BAP address identifier may also be referred to as a BAP entity ID, a BAP ID, or the like;
  a cell identifier, including but not limited to a Physical Cell Identifier (PCI) or an E-UTRAN Cell Global Identifier (ECGI); or
  a pre-allocated IAB node identifier.

Figure 11:
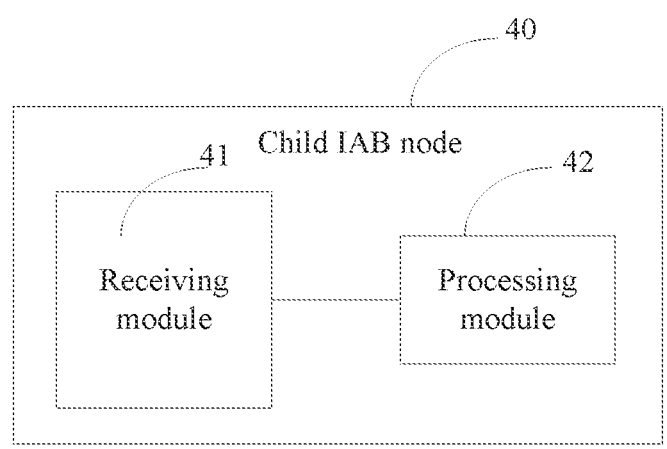
FIG. 11 is a schematic structural diagram of a module of a child IAB node according to an embodiment of the present disclosure.

As shown in FIG. 11, the child IAB node 40 in this embodiment of the present disclosure includes a recovery failure processing apparatus for an integrated access backhaul radio link that can implement the recovery failure processing method for an integrated access backhaul radio link performed by the child IAB node in the foregoing embodiment, and achieve the same effect. In some embodiments, the child IAB node 40 includes the following functional modules:

a receiving module 41, configured to receive a radio link recovery failure message of an IAB node, where the radio link recovery failure message includes a message type indicator, and the message type indicator indicates a message type of the radio link recovery failure message; and a processing module 42, configured to reestablish a radio link.

In this embodiment, the IAB node sends a radio link recovery failure message to a child IAB node, where the radio link recovery failure message includes a message type indicator, and the message type indicator indicates a message type of the radio link recovery failure message. After receiving the radio link recovery failure message, the child IAB node can identify that the message type belongs to the radio link recovery failure message based on the message type indicator, and then reestablishes the radio link. In the technical solutions of the present disclosure, the performance of the reestablished backhaul link can be guaranteed.

In the exemplary embodiments of the present disclosure, the radio link recovery failure message further includes at least one of the following:
  identification information of the IAB node that triggers the radio link recovery failure message, where the identification information may be used to identify the IAB node; or
  an ID list of a path blocked due to radio link recovery failure.

In the exemplary embodiments of the present disclosure, the IAB node that triggers the radio link recovery failure message includes at least one of the following:
  an IAB node that initially triggers the radio link recovery failure message; or
  an IAB node that fails to reestablish a radio link after receiving a radio link recovery failure message of an upstream IAB node.

The identification information includes at least one of the following:
  a BAP address identifier, where the BAP address identifier may also be referred to as a BAP entity ID, a BAP ID, and the like;
  a cell identifier, including but not limited to a PCI and an ECGI; or
  a pre-allocated IAB node identifier.

In this embodiment, after the child IAB node receives the radio link recovery failure message from the IAB node, if the child IAB node does not find a suitable parent IAB node and reestablishes the radio link, the child IAB node needs to determine whether to update the radio link recovery failure message based on a content requirement of the radio link recovery failure message, and then sends the radio link recovery failure message to the downstream IAB node.

In an exemplary embodiment of the present disclosure, in a case that the received radio link recovery failure message only includes the message type indicator, or only includes the message type indicator and the identification information of the IAB node that initially triggers the radio link recovery failure message, the apparatus further includes:
  a first sending module, configured to send, in a case that the radio link fails to reestablish, a first radio link recovery failure message to a downstream IAB node, where the first radio link recovery failure message is the received radio link recovery failure message.

In another exemplary embodiment of the present disclosure, in a case that the received radio link recovery failure message further includes at least one of the following: identification information of the IAB node that fails to reestablish a radio link after receiving a radio link recovery failure message of an upstream IAB node; or the ID list of a path blocked due to radio link recovery failure, the apparatus further includes:
 a second sending module, configured to: in a case that the radio link fails to reestablish, add at least one of the following information to the received radio link recovery failure message to form a second radio link recovery failure message, and send the second radio link recovery failure message to a downstream IAB node:
 the identification information of the IAB node; or
 the path ID that is blocked due to the radio link failure of the IAB node and that is not included in the received radio link recovery failure message.

In some embodiments, newly added identification information is located at an end of the second radio link recovery failure message.

In the exemplary embodiments of the present disclosure, in a case that the received radio link recovery failure message meets at least one of the following conditions:
 including an identification information list of the IAB node that triggers the radio link recovery failure message; or
 including the path ID list and being able to determine the IAB node that triggers the radio link recovery failure message based on the path ID list,
 in radio link reestablishment, an IAB node other than the IAB node is selected as a parent IAB node, or an IAB node other than the IAB node is selected as a parent IAB node within a preset time window.

Figure 12:
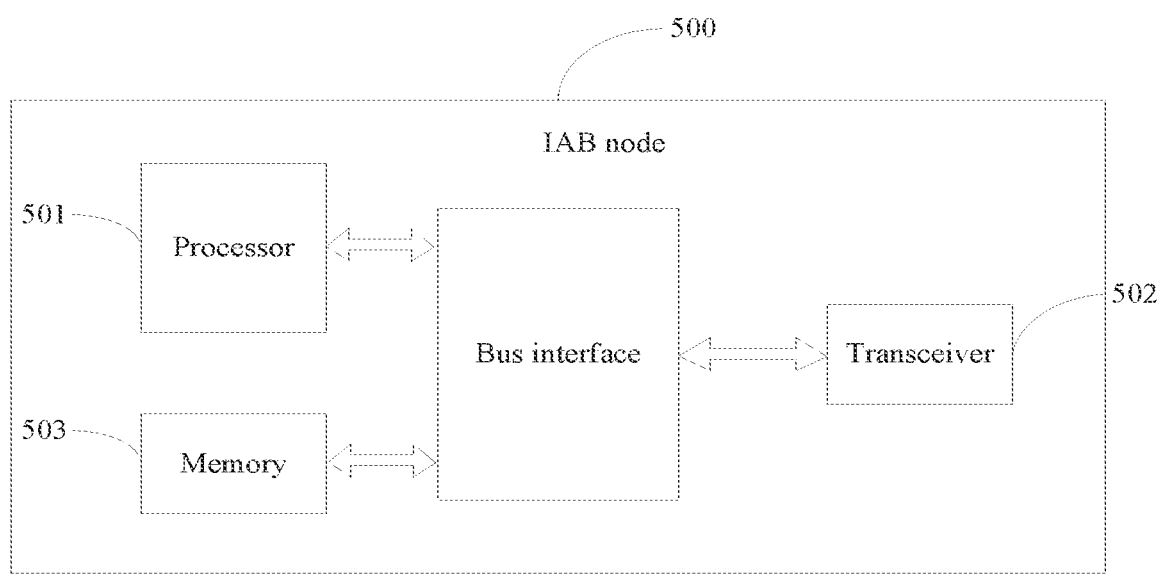
FIG. 12 is a schematic diagram of the composition of an IAB node according to an embodiment of the present disclosure.

Referring to FIG. 12, an embodiment of the present disclosure provides an IAB node 500, including: a processor 501, a transceiver 502, a memory 503, and a bus interface.

The processor 501 may be responsible for managing the bus architecture and general processing. The memory 503 may store data used by the processor 501 when the processor performs an operation.

In this embodiment of the present disclosure, the IAB node 500 may further include: a computer program stored in the memory 503 and executable on the processor 501, where when the computer program is executed by the processor 501, the following are realized: sending, in a case that the radio link fails to recover, a radio link recovery failure message to a child IAB node, where the radio link recovery failure message includes a message type indicator, and the message type indicator indicates a message type of the radio link recovery failure message.

In FIG. 12, a bus architecture may include any quantity of interconnected buses and bridges, and is linked by various circuits of one or more processors represented by the processor 501 and a memory represented by the memory 503. The bus architecture may further link various other circuits such as a peripheral device, a voltage regulator, and a power management circuit. These are well known in the art, and therefore are not further described in the embodiments of the present disclosure. The bus interface provides interfaces. The transceiver 502 may be a plurality of elements, in other words, includes a transmitter and a receiver, and provides a unit configured to communicate with various other apparatuses on a transmission medium.

The IAB node 500 provided in this embodiment of the present disclosure may perform the foregoing method embodiment performed by the IAB node 500. An implementation principle and a technical effect of the terminal are similar to those of the method embodiment, and details are not described again in this embodiment.

An embodiment of the present disclosure further provides a computer-readable storage medium. The computer-readable storage medium stores a computer program. The computer program implements, when executed by a processor, each process of the recovery failure processing method embodiments for an integrated access backhaul radio link of the foregoing IAB node, and a same technical effect can be achieved. To avoid repetition, details are not described herein again. The computer-readable storage medium includes a Read-Only Memory (ROM), a Random Access Memory (RAM), a magnetic disk, an optical disc, or the like.

Figure 13:
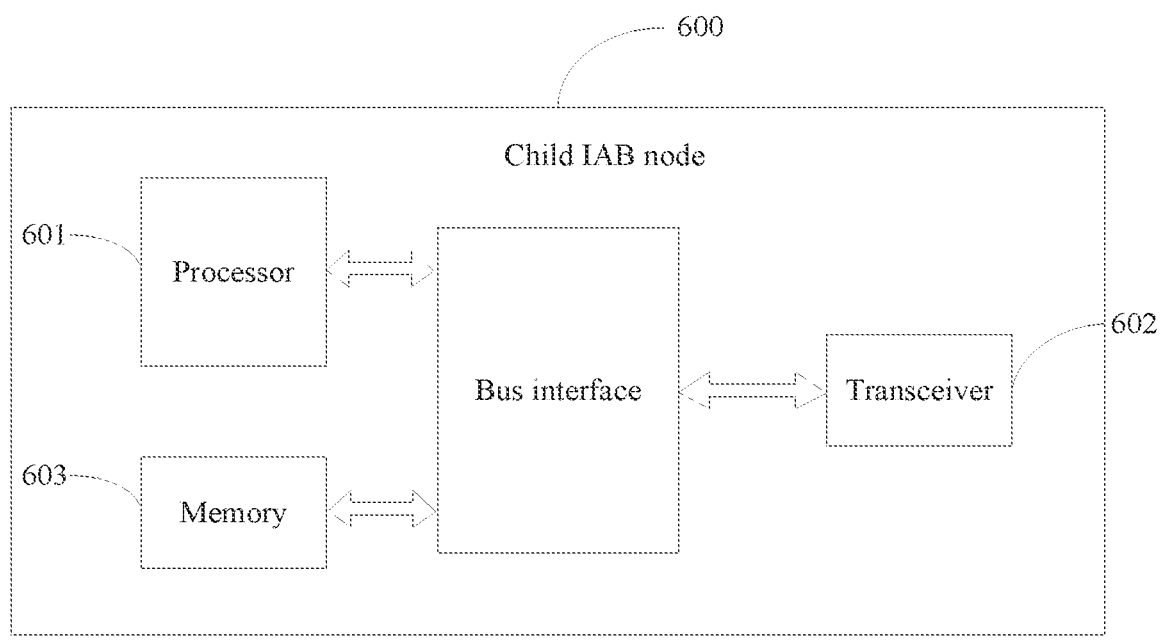
FIG. 13 is a schematic diagram of the composition of a child IAB node according to an embodiment of the present disclosure.

Referring to FIG. 13, an embodiment of the present disclosure provides a child IAB node 600, including: a processor 601, a transceiver 602, a memory 603, and a bus interface.

The processor 601 may be responsible for managing the bus architecture and general processing. The memory 603 may store data used by the processor 601 when the processor performs an operation.

In this embodiment of the present disclosure, the child IAB node 600 may further include: a computer program stored in the memory 603 and executable on the processor 601, where when the computer program is executed by the processor 601, the following are realized: receiving a radio link recovery failure message of an IAB node, where the radio link recovery failure message includes a message type indicator, and the message type indicator indicates a message type of the radio link recovery failure message; and reestablishing a radio link.

In FIG. 13, a bus architecture may include any quantity of interconnected buses and bridges, and is linked by various circuits of one or more processors represented by the processor 601 and a memory represented by the memory 603. The bus architecture may further link various other circuits such as a peripheral device, a voltage regulator, and a power management circuit. These are well known in the art, and therefore are not further described in the embodiments of the present disclosure. The bus interface provides interfaces. The transceiver 602 may be a plurality of elements, in other words, includes a transmitter and a receiver, and provides a unit configured to communicate with various other apparatuses on a transmission medium.

The child IAB node 600 provided in this embodiment of the present disclosure may perform the foregoing method embodiment performed by the child IAB node 600. An implementation principle and a technical effect of the terminal are similar to those of the method embodiment, and details are not described again in this embodiment.

An embodiment of the present disclosure further provides a computer-readable storage medium. The computer-readable storage medium stores a computer program. The computer program implements, when executed by a processor, each process of the recovery failure processing method embodiments for an integrated access backhaul radio link of the foregoing child IAB node, and a same technical effect can be achieved. To avoid repetition, details are not described herein again. The computer-readable storage medium includes a Read-Only Memory (ROM), a Random Access Memory (RAM), a magnetic disk, an optical disc, or the like.

The method or algorithm steps described in combination with content disclosed in the present disclosure may be implemented by hardware, or may be implemented by a processor by executing software instructions. The software instruction may be formed by a corresponding software module. The software module may be stored in a RAM, a flash memory, a ROM, an EPROM, an EEPROM, a register, a hard disk, a removable hard disk, a read-only compact disc, or a storage medium of any other form known in the art. For example, a storage medium is coupled to the processor, so that the processor can read information from the storage medium or write information into the storage medium. The storage medium may also be a component of the processor. The processor and the storage medium may be located in the ASIC. In addition, the ASIC may be located in a core network interface device. The processor and the storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a computer-readable medium or transmitted as one or more instructions or code in the computer-readable medium.

The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the present disclosure are further described in detail in the foregoing description of embodiments. It should be understood that the foregoing descriptions are merely description of embodiments of the present disclosure, and are not intended to limit the protection scope of the present disclosure. Any modification, equivalent replacement, improvement, or the like made on the basis of the technical solutions of the present disclosure shall fall within the protection scope of the present disclosure.

A person skilled in the art should understand that the embodiments of the present disclosure can be provided as a method, a system, or a computer program product. Therefore, the embodiments of the present disclosure may be embodiments in a form of a hardware embodiment, a software embodiment, or an embodiment incorporating software and hardware aspects. Moreover, the embodiments of the present disclosure may use a form of a computer program product that is implemented on one or more computer-usable storage media (including but not limited to a magnetic disk memory, a CD-ROM, an optical memory, and the like) that include a computer-usable program code.

It can be understood that the embodiments described in some embodiments of the present application may be implemented by hardware, software, firmware, middleware, a microcode, or a combination thereof. For implementation with hardware, a module, a unit, a submodule, a subunit, or the like can be implemented in one or more Application Specific Integrated Circuits (ASIC), a Digital Signal Processing (DSP), a DSP Device (DSPD), a Programmable Logic Device (PLD), a Field-Programmable Gate Arrays (FPGA), general processors, controllers, micro-controllers, microprocessors, and another electronic unit for implementing the functions of the present application, or their combinations.

The embodiments of the present disclosure are described with reference to the flowcharts and/or block diagrams of the methods, devices (systems), and computer program products according to the embodiments of the present disclosure. It should be understood that each process and/or block in the flowchart and/or block diagram as well as a combination of processes and/or blocks in the flowchart and/or block diagram may be implemented by computer program instructions. These computer program instructions can be provided to a general-purpose computer, a special-purpose computer, an embedded processor, or a processor of another programmable data processing device to generate a machine, so that an apparatus configured to implement functions specified in one or more procedures of a flowchart and/or one or more blocks of a block diagram is generated by using the instructions executed by the computer or the processor of the another programmable data processing device.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a function specified in one or more procedures of the flowchart and/or in one or more blocks of the block diagram.

These computer program instructions may also be loaded onto a computer or another programmable data processing device, so that a series of operation steps are performed on the computer or another programmable device to produce computer-implemented processing, thereby providing instructions executed on the computer or another programmable device to implement steps for the function specified in one or more processes of the flowchart and/or one or more blocks of the block diagram.

Obviously, a person skilled in the art can make various modifications and variations to the embodiments of the present disclosure without departing from the spirit and scope of the present disclosure. In this way, the present disclosure is intended to include these modifications and variations to the embodiments of the present disclosure provided that these modifications and variations fall within the scope of the claims of the present disclosure and their equivalent technologies.

The invention claimed is:

1. A recovery failure processing method for an integrated access backhaul radio link, performed by an integrated access backhaul (IAB) node in an integrated access backhaul link, comprising:
sending, when the radio link fails to recover, a radio link recovery failure message to a child IAB node, wherein the radio link recovery failure message comprises a message type indicator that indicates a message type of the radio link recovery failure message and identification information of the IAB node that triggers the radio link recovery failure message, wherein the identification information comprises an address identifier of a backhaul adaptation protocol (BAP).

2. The recovery failure processing method for an integrated access backhaul radio link according to claim 1, wherein the radio link recovery failure message further comprises:
an ID list of a path blocked due to radio link recovery failure.

3. The recovery failure processing method for an integrated access backhaul radio link according to claim 1, wherein the IAB node that triggers the radio link recovery failure message comprises at least one of the following:
an IAB node that initially triggers the radio link recovery failure message; or
an IAB node that fails to reestablish a radio link after receiving a radio link recovery failure message of an upstream IAB node.

4. The recovery failure processing method for an integrated access backhaul radio link according to claim 1, wherein the identification information further comprises at least one of the following:
a cell identifier; or
a pre-allocated IAB node identifier.

5. A recovery failure processing method for an integrated access backhaul radio link, performed by a child integrated access backhaul (IAB) node in an integrated access backhaul link and comprising:
receiving a radio link recovery failure message of an IAB node, wherein the radio link recovery failure message comprises a message type indicator that indicates a message type of the radio link recovery failure message and identification information of the IAB node that triggers the radio link recovery failure message, wherein the identification information comprises an address identifier of a backhaul adaptation protocol (BAP); and
reestablishing a radio link.

6. The recovery failure processing method for an integrated access backhaul radio link according to claim 5, wherein the radio link recovery failure message further comprises:
an ID list of a path blocked due to radio link recovery failure.

7. The recovery failure processing method for an integrated access backhaul radio link according to claim 5, wherein the IAB node that triggers the radio link recovery failure message comprises at least one of the following:
an IAB node that initially triggers the radio link recovery failure message; or
an IAB node that fails to reestablish a radio link after receiving a radio link recovery failure message of an upstream IAB node.

8. The recovery failure processing method for an integrated access backhaul radio link according to claim 5, wherein the identification information further comprises at least one of the following:
a cell identifier; or
a pre-allocated IAB node identifier.

9. The recovery failure processing method for an integrated access backhaul radio link according to claim 5, further comprising:
sending, when the radio link fails to reestablish, a first radio link recovery failure message to a downstream IAB node, wherein the first radio link recovery failure message is the received radio link recovery failure message.

10. The recovery failure processing method for an integrated access backhaul radio link according to claim 7, wherein when the received radio link recovery failure message further comprises at least one of the following: identification information of the IAB node that fails to reestablish a radio link after receiving a radio link recovery failure message of an upstream IAB node; or the ID list of a path blocked due to radio link recovery failure, the method further comprises:
when the radio link fails to reestablish, adding at least one of the following information to the received radio link recovery failure message to form a second radio link recovery failure message, and sending the second radio link recovery failure message to a downstream IAB node:
the identification information of the IAB node; or
the path ID that is blocked due to the radio link failure of the IAB node and that is not comprised in the received radio link recovery failure message.

11. The recovery failure processing method for an integrated access backhaul radio link according to claim 10, wherein newly added identification information is located at an end of the second radio link recovery failure message.

12. The recovery failure processing method for an integrated access backhaul radio link according to claim 6, wherein when the received radio link recovery failure message meets at least one of the following conditions:
comprising an identification information list of the IAB node that triggers the radio link recovery failure message; or
comprising the path ID list and being able to determine the IAB node that triggers the radio link recovery failure message based on the path ID list,
in radio link reestablishment, an IAB node other than the IAB node is selected as a parent IAB node, or an IAB node other than the IAB node is selected as a parent IAB node within a preset time window.

13. A communications device, comprising:
a memory storing a computer program; and
a processor coupled to the memory and configured to execute the computer program to perform a recovery failure processing method for an integrated access backhaul radio link, the method comprising:
sending, when the radio link fails to recover, a radio link recovery failure message to a child IAB node, wherein the radio link recovery failure message comprises a message type indicator that indicates a message type of the radio link recovery failure message and identification information of the IAB node that triggers the radio link recovery failure message, wherein the identification information comprises an address identifier of a backhaul adaptation protocol (BAP).

14. The communication device according to claim 13, wherein the radio link recovery failure message further comprises:
an ID list of a path blocked due to radio link recovery failure.

15. The communication device according to claim 13, wherein the IAB node that triggers the radio link recovery failure message comprises at least one of the following:
an IAB node that initially triggers the radio link recovery failure message; or
an IAB node that fails to reestablish a radio link after receiving a radio link recovery failure message of an upstream IAB node.

16. The communication device according to claim 13, wherein the identification information further comprises at least one of the following:
a cell identifier; or
a pre-allocated IAB node identifier.

* * * * *